United States Patent [19]
Ando

[11] Patent Number: 6,088,315
[45] Date of Patent: Jul. 11, 2000

[54] DISC RECORDING AND/OR REPRODUCING APPARATUS AND ITS MOTOR DRIVE CONTROL CIRCUIT

[75] Inventor: Ryo Ando, Tokyo, Japan

[73] Assignee: Sony Corporation, Tokyo, Japan

[21] Appl. No.: 09/081,148

[22] Filed: May 19, 1998

[30] Foreign Application Priority Data

| May 28, 1997 | [JP] | Japan | ................................ | P09-138454 |
| Jun. 27, 1997 | [JP] | Japan | ................................ | P09-171745 |

[51] Int. Cl.$^7$ ...................................................... G11B 7/00
[52] U.S. Cl. ................................. 369/50; 369/47; 369/58; 369/60
[58] Field of Search ................................. 369/50, 47, 48, 369/49, 54, 58, 59, 60

[56] References Cited

U.S. PATENT DOCUMENTS

| 5,153,869 | 10/1992 | Yoshimaru et al. | ................... | 369/50 X |
| 5,408,478 | 4/1995 | Ohmori et al. | ......................... | 371/37.5 |
| 5,412,629 | 5/1995 | Shirane | ................................ | 369/50 X |
| 5,521,895 | 5/1996 | Muira et al. | .............................. | 369/50 |
| 5,559,769 | 9/1996 | Ando et al. | ............................ | 369/44.27 |
| 5,703,854 | 12/1997 | Kuroda et al. | .............................. | 369/50 |

*Primary Examiner*—Muhammad Edun
*Attorney, Agent, or Firm*—Limbach & Limbach LLP

[57] ABSTRACT

A motor rotation control circuit of a disc recording and/or reproducing apparatus has first and second rotation control units and a switching circuit. Information extracted from data read out from a disc is supplied to the first rotation control unit. The first rotation control unit forms a first control signal to rotate a disc rotating motor at a constant linear velocity. A signal indicative of the detection of the rotation of the motor to rotate, the disc is supplied to the second rotation control unit. The second rotation control unit forms a second control signal to rotate the motor at a constant angular velocity. The second rotation control unit fetches rotational speed information of the disc when switching from the first rotation control unit to the second rotation control unit and forms the second control signal to control the motor on the basis of the fetched rotational speed information of the disc when switched from the first rotation control unit to the second rotation control unit. The switching circuit switches the first and second control signals on the basis of a switching signal which is supplied from the controller and outputs the switched control signal. The switching circuit generates the first control signal from the first rotation control unit while the data is read out from the disc and generates the second control signal from the second rotation control unit while the reading operation of the data from the disc is stopped.

32 Claims, 7 Drawing Sheets

DISC RECORDING AND/OR REPRODUCING APPARATUS AND ITS MOTOR DRIVE CONTROL CIRCUIT

BACKGROUND OF THE INVENTION

1. Field of the Invention

The invention relates to a disc reproducing apparatus, a disc recording and/or reproducing apparatus, and a motor control circuit of the disc recording and/or reproducing apparatus. More particularly, the invention relates to a disc reproducing apparatus, a disc recording and/or reproducing apparatus, and a motor control circuit of the disc recording and/or reproducing apparatus, in which the reading operation of data from a disc and the recording operation of data to the disc are intermittently executed.

2. Description of the Related Art

A recording and/or reproducing apparatus for compressing digital audio data and recording and/or reproducing the compressed data to an optical disc or magnetooptic disc having a diameter of, for example, 64 mm enclosed in a disc cartridge is prevailing. In the recording and/or reproducing apparatus, the digital audio data is compressed and recorded onto the optical disc or magnetooptic disc, thereby enabling the digital audio data of a recording time which is almost equivalent to a CD (Compact Disc) to be recorded by using the foregoing optical disc of a diameter of 64 mm. As a compression system of digital audio data, a system for compressing data on the basis of MDCT (Modified Discrete Cosine Transform) is used.

In the recording and/or reproducing apparatus, upon reproduction, the recording data recorded on the optical disc is read out from the optical disc and the read-out recording data is subjected to an EFM demodulation and an error correcting process and, after that, the processed data is once accumulated in a buffer memory. The digital data read out from the buffer memory is sent to a decoder and is decompressed.

A transfer rate of the data read out from the optical disc when the reproduction is performed by the foregoing recording and/or reproducing apparatus is equal to a rate of 1.4 Mbits/sec. On the other hand, a data transfer rate which is necessary in the decoder is equal to 0.3 Mbits/sec. Therefore, the data read out from the optical disc is written into the buffer memory at a rate of 1.4 Mbits/sec. and is read out from the buffer memory at a rate of 0.3 Mbits/sec. Since the transfer rate of the data read out from the optical disc is higher than the reading rate of the data from the decoder, the data read out from the optical disc is successively accumulated into the buffer memory. At a time point when a certain amount of data has been stored in the buffer memory, the reading operation of the data from the optical disc is stopped and the reading operation of the data from the buffer memory is continued. When an amount of data stored in the buffer memory is smaller than a predetermined amount, the reading operation of the data from the optical disc is restarted and the read-out data is written into the buffer memory as mentioned above.

In the foregoing recording and/or reproducing apparatus, the reading operation of the data from the optical disc is intermittently performed. For a period of time during which the data of a predetermined amount or more has been stored in the buffer memory and the data is not read out from the optical disc, only the reading operation of the data from the buffer memory and the decoding process of the data read out from the buffer memory are executed. Therefore, in case of intermittently reading out the data from the optical disc, for a period of time during which the reading operation from the optical disc is not performed, it is sufficient to make operative only a portion of the reading process of the buffer memory, a portion of a decoding process, and a portion of a D/A converting process for converting the reproduction data into an analog signal and outputting, and the other circuit portions, namely, a driving circuit of a laser beam, a servo circuit, a demodulating circuit, and the like can be turned off. By turning off the other circuit portions as mentioned above for a period of time during which the reading operation of the optical disc is not performed, an electric power consumption can be reduced by an amount corresponding to such a turn-off state.

Data has been recorded at a constant linear velocity on the optical disc or magnetooptic disc which is used in the foregoing recording and/or reproducing apparatus. When the data is read out from the optical disc or magnetooptic disc, it is necessary to control a rotational speed of the disc to a constant linear velocity. When the reading operation of the disc is not executed as mentioned above, the control such as to keep the rotational speed of the disc at a constant linear velocity is unnecessary. When the reading operation of the disc is not performed, a method of reducing the electric power consumption by stopping a power supply to a spindle motor for rotating the disc or turning off the servo of the spindle motor is considered.

However, if the rotation of the optical disc or magnetooptic disc is stopped when the reading operation of the data from the optical disc or magnetooptic disc is not performed, in case of restarting the rotation of the optical disc or magnetooptic disc, a large current is needed as a driving current to activate the spindle motor, so that an electric power consumption contrarily increases. If the spindle servo of the spindle motor is turned off, the rotational speed of the optical disc or magnetooptic disc becomes unstable for such a turn-off period of time and a speed difference between such an unstable rotational speed and the rotational speed of the optical disc or magnetooptic disc while the servo is turned off when the rotation of the optical disc or magnetooptic disc is restarted increases. Therefore, a large current is necessary as a driving current to drive the spindle motor until the rotational speed of the optical disc or magnetooptic disc is controlled to a predetermined rotational speed, contrarily resulting in an increase in electric power consumption. In the foregoing recording and/or reproducing apparatus, therefore, upon reproduction, the reading operation of the optical disc or magnetooptic disc is intermittently performed. When data is read out from the optical disc or magnetooptic disc, the disc is controlled at a constant linear velocity. When the optical disc or magnetooptic disc is not read out, it is desired to control the optical disc or magnetooptic disc at a constant angular velocity.

There is considered a method of controlling in a manner such that the optimum angular velocity is obtained by an arithmetic operation from an address on the optical disc or magnetooptic disc from which data is being read out, and when the operating mode is switched from the reading mode of the optical disc or magnetooptic disc to a mode in which the reading operation of the optical disc or magnetooptic disc is not performed, the rotational speed of the optical disc or magnetooptic disc is controlled to a constant angular velocity in accordance with the angular velocity obtained by the arithmetic operation.

For example, FIG. 1 shows an example of a conventional servo circuit in case of rotating an optical disc 101 at a constant angular velocity when data is not read out from the optical disc 101. As shown in FIG. 1, a servo circuit comprises: a period measuring circuit 111 for detecting a rotational speed of a spindle motor 102 and measuring a period of an FG signal as a detection signal; a reference value register 112; a comparing circuit 113; a low pass filter 114; and a driver 115. A reference value arithmetic operating circuit 116 for operating an optimum reference value for the reference value register 112 is provided. An address is supplied from a system controller (not shown) to the reference value register 116 through a terminal 117.

An FG signal is generated from the spindle motor 102 in accordance with the rotational speed of the spindle motor 102. The FG signal is supplied to the FG period measuring circuit 111. The FG period measuring circuit 111 measures the period of the FG signal. An angular velocity of the spindle motor 102 is detected from the period of the FG signal. An output of the FG period measuring circuit 111 is supplied to the comparing circuit 113.

An output of the reference value register 112 is supplied to the comparing circuit 113. An output of the reference value arithmetic operating circuit 116 is supplied to the reference value register 112. The reference value arithmetic operating circuit 116 calculates an optimum reference value on the basis of the address which is supplied from the system controller (not shown) through the input terminal 117.

That is, if the address of the data reading position on the optical disc or magnetooptic disc is known, the distance of such a position in the radial direction from the center of the optical disc or magnetooptic disc can be known. Therefore, the rotational speed at the foregoing reading position in case of rotating the optical disc or magnetooptic disc at the constant linear velocity can be obtained from the distance in the radial direction from the center of the optical disc or magnetooptic disc and the angular velocity of the optical disc by an arithmetic operation. On the basis of the result of the arithmetic operation, the reference value of the rotational speed is outputted from the reference value arithmetic operating circuit 116. An output of the reference value arithmetic operating circuit 116 is supplied to the reference value register 112.

The comparing circuit 113 compares the period of the FG signal serving as a reference and stored in the reference value register 112 with the present period of the FG signal of the spindle motor 102, thereby obtaining a speed error and a phase error. An output of the comparing circuit 113 is supplied to the spindle motor 102 through the low pass filter 114 and driving circuit 115.

As mentioned above, the optimum angular velocity of each address of the optical disc or magnetooptic disc is obtained by the reference value arithmetic operating circuit 116 and when the operating mode is switched from the reading mode of the optical disc or magnetooptic disc to the mode where the reading operation of the optical disc or magnetooptic disc is not performed, by controlling the rotational speed of the optical disc or magnetooptic disc so as to be a constant angular velocity in accordance with the optimum angular velocity obtained by the arithmetic operation as mentioned above, it is possible to prevent the occurrence of a speed difference between the rotational speed of the optical disc or magnetooptic disc when the reading operation of the optical disc or magnetooptic disc is not performed and the rotational speed when the reading operation of the optical disc or magnetooptic disc is restarted.

However, the linear velocity of the optical disc or magnetooptic disc in the foregoing recording and/or reproducing apparatus has a variation in a range from 1.2 m/sec to 1.4 m/sec. That is, the linear velocity is equal to 1.4 m/sec in the magnetooptic disc which can record data corresponding to 60 minutes or the optical disc on which data as much as 60 minutes has been recorded. The linear velocity is equal to 1.2 m/sec in the magnetooptic disc which can record data as much as 72 minutes or the optical disc on which data as much as 74 minutes has been recorded. As mentioned above, in case of obtaining the optimum angular velocity corresponding to the address on the disc and controlling the optical disc or magnetooptic disc so as to rotate at a constant angular velocity, the reference value of the rotational speed is obtained from the address and the angular velocity of the disc by the reference value arithmetic operating circuit 116 by an arithmetic operation. Therefore, as mentioned above, in case of obtaining the optimum angular velocity corresponding to the address on the disc and controlling the rotational speed so as to be the constant angular velocity, the optimum angular velocity cannot be obtained unless the variation in linear velocity as mentioned above is considered.

In the foregoing recording and/or reproducing apparatus, the writing operation of the magnetooptic disc is intermittently performed even upon recording. Even in case of intermittently performing the writing operation to the magnetooptic disc as mentioned above, it is desirable to control so as not to cause a speed difference between the rotational speed when the writing operation of the magnetooptic disc is not performed and the rotational speed of the magnetooptic disc when the writing operation of the magnetooptic disc is restarted.

When the control mode of the optical disc is switched from the rotating state of the constant linear velocity to the rotating state of the constant angular velocity, in case of setting the rotational speed of the disc so as not to cause a difference between the rotational speeds of the optical disc, the rotational speed of the optical disc when the rotation is controlled at the constant angular velocity differs depending on the scanning position of the optical head. In the foregoing recording and/or reproducing apparatus, although a gain of a CAV servo circuit is constant, when the rotational speed of the optical disc differs, the gain of the servo loop changes. It is, therefore, desirable to control the gain of the CAV servo circuit in accordance with the rotational speed of the optical disc.

OBJECTS AND SUMMARY OF THE INVENTION

It is, therefore, an object of the present invention to provide a disc reproducing apparatus which resolves the above-mentioned problem.

It is another object of the present invention to provide a disc recording and/or reproducing apparatus which resolves the above-mentioned problem.

It is further object of the present invention to provide a motor driving and controlling circuit of a disc recording and/or reproducing apparatus which resolves the above-mentioned problem.

According to the present invention, there is provided a disc reproducing apparatus including: a head; a memory; a motor; first and second rotation control circuits; and a controller. The head reads out data recorded on a disc. The memory temporarily stores the data read out by the head. The motor rotates the disc. The first rotation control circuit controls the motor so as to rotate the disc at a constant linear velocity. The second rotation control circuit controls the motor so as to rotate the disc at a constant angular velocity.

The second rotation control circuit fetches rotational speed information of the disc when the control circuit is switched from the first rotation control circuit to the second rotation control circuit and controls the motor on the basis of the rotational speed information of the disc fetched when the control circuit is switched from the first rotation control circuit to the second rotation control circuit. The controller controls the operations of the head, memory, and first and second rotation control circuits. The controller controls the writing and reading operations of the memory so that the data is read out from the memory at a reading speed slower than a writing speed of the data read out from the disc by the head. The controller stops the reading operation of the data from the disc by the head at a time point when a predetermined amount of data has been written into the memory, controls the head when an amount of data stored in the memory is equal to or less than a predetermined amount, thereby restarting the reading operation of the data from the disc. The controller forms a switching signal to switch the control circuit from the first rotation control circuit to the second rotation control circuit by the controller. While the data is read out from the disc by the head, the controller allows the first rotation control circuit to rotate the disc at a constant linear velocity. While the reading operation of the data from the disc by the head is stopped, the controller allows the second rotation control circuit to rotate the disc at a constant angular velocity.

According to the present invention, there is provided a disc recording and/or reproducing apparatus including: a head mechanism; a memory; first and second rotation control circuits; and a controller. The head mechanism is fed in the radial direction of a disc and executes a recording of data to the disc or a reproduction to read out the recorded data. The memory temporarily stores the data read out from the disc by the head mechanism and also temporarily stores data which is recorded onto the disc by the head mechanism. The motor rotates the disc. The first rotation control circuit controls the motor so as to rotate the disc at a constant linear velocity. The second rotation control circuit controls the motor so as to rotate the disc at a constant angular velocity. The second rotation control circuit fetches rotational speed information of the disc when the control circuit is switched from the first rotation control circuit to the second rotation control circuit and controls the motor on the basis of the rotational speed information of the disc fetched when the control circuit is switched from the first rotation control circuit to the second rotation control circuit. The controller controls the operations of the head mechanism, memory, and first and second rotation control circuits. Upon reproduction of the disc, the controller controls the writing and reading operations of the memory so that the data can be read out from the memory at a reading speed which is slower than a writing speed of the data read out from the disc by the head mechanism. The controller stops the reading operation of the data from the disc by the head mechanism at a time point when a predetermined amount of data has been written into the memory. When an amount of data stored in the memory is equal to or less than a predetermined amount, the controller controls the head mechanism so as to restart the reading operation of the data from the disc. Upon recording of the disc, the controller controls the writing and reading operations of the memory at a reading speed which is higher than a writing speed of the data into the memory. The controller records the data to the disc by controlling the head mechanism at a time point when a predetermined amount of data has been written into the memory. When an amount of data stored in the memory is equal to or less than the predetermined amount, the controller stops the recording of the data to the disc by the head mechanism. The controller forms a switching signal to switch the control circuit from the first rotation control circuit to the second rotation control circuit by the controller. While the data is read out from the disc by the head mechanism or the data is recorded onto the disc by the head mechanism, the controller allows the first rotation control circuit to rotate the disc at a constant linear velocity. While the reading operation of the data from the disc is stopped by the head mechanism or the recording of the data to the disc is stopped by the head mechanism, the controller allows the second rotation control circuit to rotate the disc at a constant angular velocity.

According to the present invention, there is provided a motor driving and controlling circuit of a disc recording and/or reproducing apparatus including first and second rotation control units and a switching circuit. The first rotation control unit receives information extracted from data read out from a disc and forms a first control signal to rotate a disc rotating motor at a constant linear velocity. The second rotation control unit receives a signal indicative of a detection of the rotation of the motor to rotate the disc and forms a second control signal to rotate the motor at a constant angular velocity. The second rotation control unit fetches rotational speed information of the disc when the control unit is switched from the first rotation control unit to the second rotation control unit. The second rotation control unit forms a second control signal to control the motor on the basis of the fetched rotational speed information of the disc when the control unit is switched from the first rotation control unit to the second rotation control unit. On the basis of the switching signal which is supplied from the controller, the switching circuit switches the first and second control signals and outputs them. While the data is read out from the disc, the switching circuit outputs the first control signal from the first rotation control unit. While the reading operation of the data from the disc is stopped, the switching circuit outputs the second control signal from the second rotation control unit.

According to the present invention, there is provided a disc reproducing apparatus including: a head; a memory; a motor; first and second rotation control circuits; and a controller. The head reads out data recorded on the disc. The memory temporarily stores the data read out by the head. The motor rotates the disc. The first rotation control circuit controls the motor so as to rotate the disc at a constant linear velocity. The second rotation control circuit controls the motor so as to rotate the disc at a constant angular velocity. The second rotation control circuit has a gain setting unit for setting a gain on the basis of rotational speed information of the disc and forms a control signal to drive the motor on the basis of the gain set by the gain setting unit. The controller controls the operations of the head, memory, and first and second rotation control circuits. The controller controls the writing and reading operations of the memory so that the data is read out from the memory at a reading speed slower than a writing speed of the data read out from the disc by the head. The controller stops the reading operation of the data from the disc by the head at a time point when a predetermined amount of data has been written in the memory. When an amount of data stored in the memory is equal to or less than the predetermined amount, the controller controls the head, thereby restarting the reading operation of the data from the disc. The controller forms a switching signal to switch the control circuit from the first rotation control circuit to the second rotation control circuit by the controller. While the data is read out from the disc by the head, the controller allows the first rotation control circuit to rotate the disc at a constant linear velocity. While the reading operation of the data from the disc by the head is stopped, the controller allows the second rotation control circuit to rotate the disc at a constant angular velocity.

According to the present invention, there is provided a disc recording and/or reproducing apparatus including: a head mechanism; a memory; first and second rotation control circuits; and a controller. The head mechanism is fed in the radial direction of a disc and executes a recording of data to the disc or a reproduction to read out the recorded data. The memory temporarily stores the data read out from the disc by the head mechanism and also temporarily stores the data which is recorded onto the disc by the head mechanism. The motor rotates the disc. The first rotation control circuit controls the motor so as to rotate the disc at a constant linear velocity. The second rotation control circuit controls the motor so as to rotate the disc at a constant angular velocity. The second rotation control circuit has a gain setting unit for setting a gain on the basis of the rotational speed information of the disc and forms a control signal to drive the motor on the basis of the gain set by the gain setting unit. The controller controls the operations of the head mechanism, memory, and first and second rotation control circuits. Upon reproduction of the disc, the controller controls the writing and reading operations of the memory so that the data is read out from the memory at a reading speed slower than a writing speed of the data read out from the disc by the head mechanism. The controller stops the reading operation of the data from the disc by the head mechanism at a time point when a predetermined amount of data has been written into the memory. When an amount of data stored in the memory is equal to or less than the predetermined amount, the controller controls the head mechanism, thereby restarting the reading operation of the data from the disc. Upon recording of the disc, the controller controls the writing and reading operations of the memory at a reading speed higher than a writing speed of the data into the memory. The controller controls the head mechanism so as to record the data onto the disc at a time point when a predetermined amount of data has been written into the memory. When an amount of data stored in the memory is equal to or less than the predetermined amount, the controller stops the recording of the data onto the disc by the head mechanism. The controller forms a switching signal to switch the control circuit from the first rotation control circuit to the second rotation control circuit by the controller. While the data is read out from the disc by the head mechanism or the recording is performed to the disc by the head mechanism, the controller allows the first rotation control circuit to rotate the disc at a constant linear velocity. While the reading operation of the data from the disc is stopped by the head mechanism or the recording of the data onto the disc is stopped by the head mechanism, the controller allows the second rotation control circuit to rotate the disc at a constant angular velocity.

According to the present invention, there is provided a motor driving and controlling circuit of a disc recording and/or reproducing apparatus including first and second rotation control units and a switching circuit. The first rotation control unit receives information extracted from data read out from a disc and forms a first control signal to rotate a disc rotating motor at a constant linear velocity. The second rotation control unit receives a signal indicative of a detection of the rotation of the motor to rotate the disc and forms a second control signal to rotate the motor at a constant angular velocity. The second rotation control unit has a gain setting unit for setting a gain on the basis of the supplied signal showing the detection of the motor rotation and forms the second control signal to drive the motor on the basis of the gain set by the gain setting unit. On the basis of the switching signal which is supplied from the controller, the switching circuit switches the first and second control signals and outputs. While the data is read out from the disc, the switching circuit outputs the first control signal from the first rotation control unit. While the reading operation of the data from the disc is stopped, the switching circuit outputs the second control signal from the second rotation control unit.

The above and other objects and features of the present invention will become apparent from the following detailed description and the appended claims with reference to the accompanying drawings.

DETAILED DESCRIPTION OF THE PREFERRED EMBODIMENTS

A disc recording and/or reproducing apparatus according to the invention will now be described in detail hereinbelow with reference to the drawings.

An optical disc 1 or an optical disc 51 which is used in the invention is a read only optical disc or a recordable magnetooptic disc having a diameter of 64 mm. The optical disc 1 is enclosed in a disc cartridge (not shown). When the optical disc 1 is a read only optical disc, tracks are formed by a plurality of pits and data such as digital audio data or the like has been recorded in a manner similar to what is called a CD (Compact Disc). When the optical disc 1 is a recordable magnetooptic disc, pregrooves which are wobbling in the radial direction of the disc have been formed on the basis of address data and data such as digital audio data or the like is recorded along the pregrooves. When the optical disc 1 is a read only optical disc, tracks comprising a plurality of pits wobble in the radial direction of the disc on the basis of address data.

Figure 1:
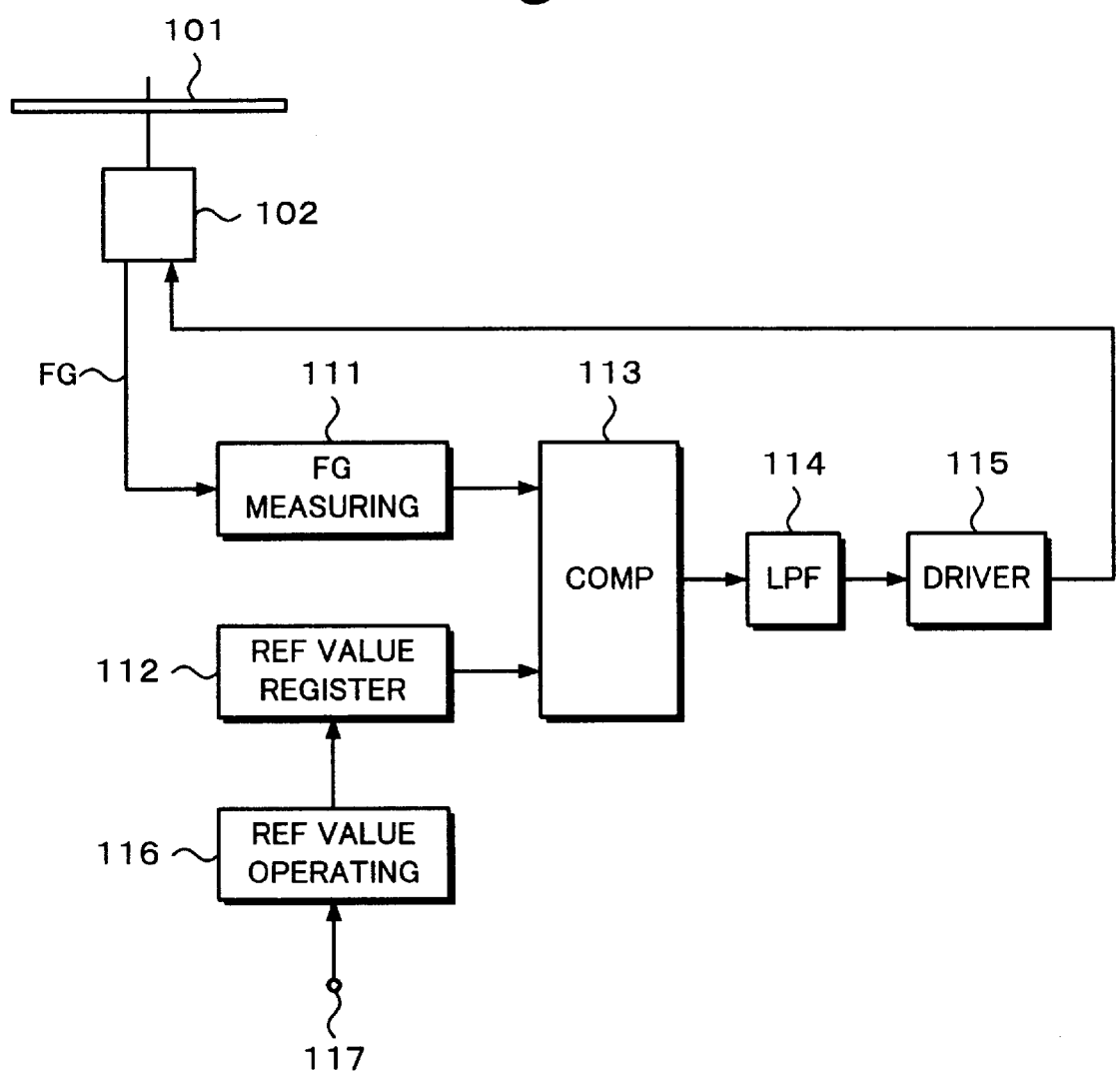
FIG. 1 is a block diagram showing a construction of a spindle servo circuit as a background of the invention.
Figure 2:
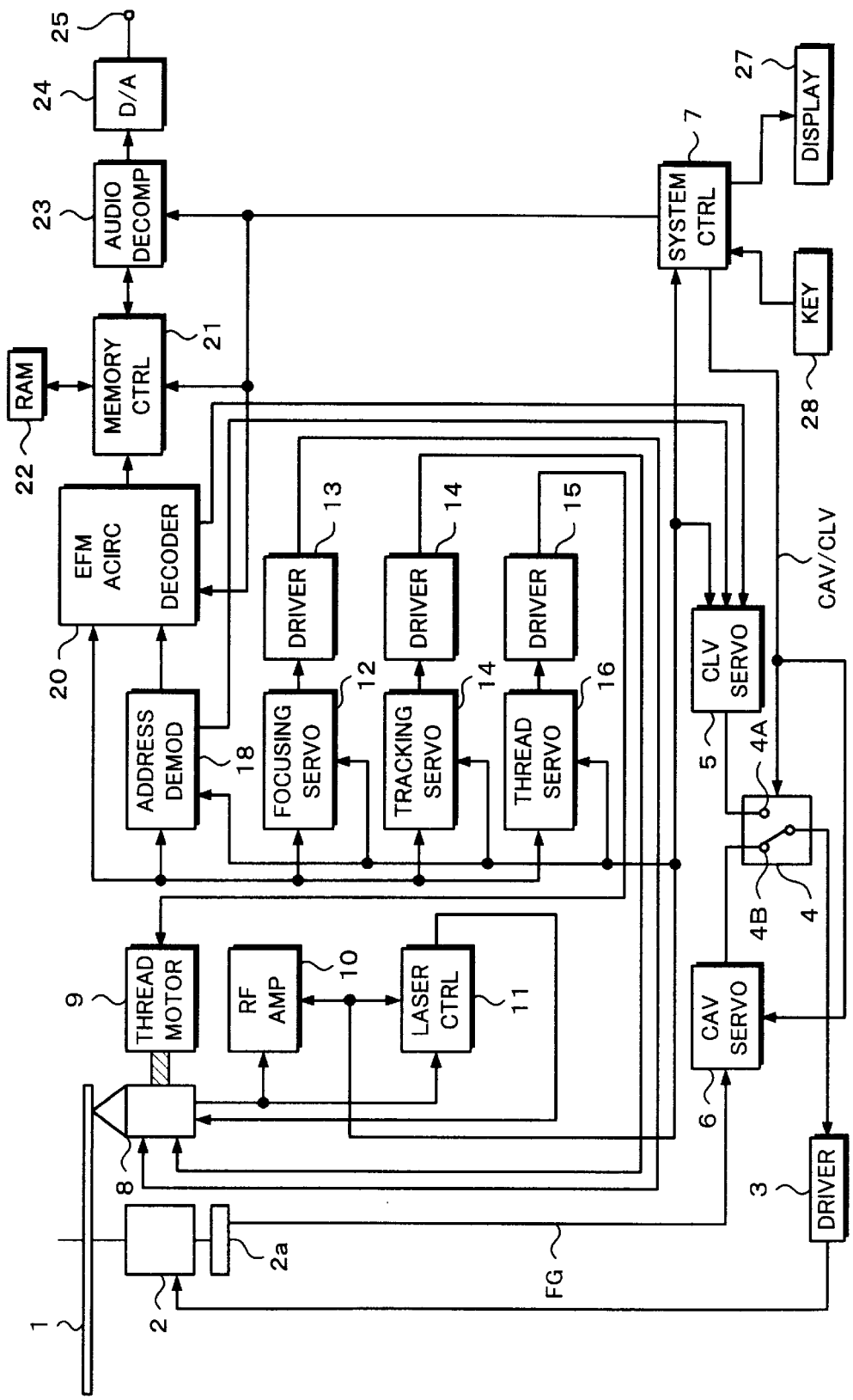
FIG. 2 is a block diagram showing a construction of a disc reproducing apparatus according to the first embodiment of the invention.

As shown in FIG. 2, the optical disc 1 is rotated by a spindle motor 2 of a reproducing apparatus according to the first embodiment. For example, a brushless motor is used as a spindle motor 2. A driving current as a driving signal is supplied from a driving circuit 3 to the spindle motor 2. A detector 2a to detect the rotation of the spindle motor 2 is attached to the spindle motor 2. The detector 2a optically or magnetically detects the rotation of the spindle motor 2 and generates an FG signal as a pulse signal according to the rotation of the spindle motor 2.

The reading operation of the optical disc 1 is intermittently performed on a cluster unit basis as will be explained hereinlater. The optical disc 1 is rotated at a constant linear velocity upon reading of data from the optical disc 1. When the data is not read out from the optical disc, the optical disc 1 is rotated at a constant angular velocity. A CLV servo circuit 5 is provided to rotate the optical disc 1 at a constant linear velocity. A CAV servo circuit 6 is provided to rotate the optical disc 1 at a constant angular velocity. The CLV servo circuit 5 rotates the optical disc 1 at a constant linear velocity on the basis of an output of an address demodulating circuit 18 or a bit clock from an EFM (8-14 modulation) and ACIRC (Advanced Cross Interleaved Reed-Solomon Code) decoder 20. The CAV servo circuit 6 rotates the optical disc 1 at a constant angular velocity on the basis of the FG signal which is generated from the spindle motor 2. Refer to, for example, U.S. Pat. No. 5,325,371 with respect to ACIRC.

An output of the CLV servo circuit 5 is supplied to a terminal 4A of a switching circuit 4. An output of the CAV servo circuit 6 is supplied to a terminal 4B of the switching circuit 4. A CLV/CAV control signal is supplied from a system controller 7 to the switching circuit 4, so that the switching circuit 4 is switched to either the terminal 4A or the terminal 4B. An output of the switching circuit 4 is supplied to the spindle motor 2 through the driving circuit 3.

An optical head 8 which faces one of the surfaces of the optical disc 1 and scans a signal recording surface of the optical disc 1 is provided for the reproducing apparatus according to the first embodiment. The optical head 8 comprises: a laser diode for emitting a laser beam to read out data from the optical disc 1; an optical system constructed by a polarization beam splitter, an objective lens for converging the laser beam emitted from the laser diode onto a signal recording surface of the optical disc 1, and the like; and a detector to detect the reflected light from the signal recording surface of the optical disc 1. An actuator is provided for the optical head 8. The objective lens of the optical head 8 is moved by the actuator in the focusing direction which is parallel with an optical axis of the objective lens (direction which is come into contact or away from the disc) and the tracking direction which is perpendicular to the optical axis of the objective lens (radial direction of the disc). The whole optical head 8 is moved in the radial direction of the optical disc 1 by a feed motor 9.

The laser beam emitted from the laser diode of the optical head 8 is reflected by the recording layer serving as a signal recording surface of the optical disc 1 or the reflecting layer. The reflected light is detected by a plurality of detecting units of the detector of the optical head 8. A part of the laser beam emitted from the laser diode is detected by a detector for monitoring (not shown). A detection output of the monitoring detector is supplied to a laser controller 11, thereby controlling so that an output level of the laser beam which is emitted from the laser diode is made constant.

The output signal from each detecting unit of the detector of the optical head 8 is supplied to an RF amplifier 10. The RF amplifier 10 arithmetically operates the output signal of each detecting unit of the detector of the optical head 8, thereby forming each of a reproduction RF signal, a tracking error signal, and a focusing error signal. The following various servo processes are executed by each of those error signals.

The focusing error signal formed by the RF amplifier 10 is supplied to a focusing servo circuit 12. The focusing servo circuit 12 forms a focusing control signal on the basis of the supplied focusing error signal. The focusing control signal is supplied to the actuator of the optical head 8 through a driving circuit 13. Thus, the objective lens of the optical head 8 is moved in the focusing direction as a direction to set off focusing errors.

The tracking error signal formed by the RF amplifier 10 is supplied to a tracking servo circuit 14. The tracking servo circuit 14 forms a tracking control signal on the basis of the supplied tracking error signal. The tracking control signal is supplied to the actuator of the optical head 8 through a driving circuit 15. Thus, the objective lens of the optical head 8 is moved in the tracking direction as a direction to set off tracking errors.

A low band signal component of the tracking error signal formed by the RF amplifier 10 is supplied to a thread servo circuit 16. The thread servo circuit 16 forms a thread control signal on the basis of the low band signal component of the supplied tracking error signal. The thread control signal is supplied to the feed motor 9 through a driving circuit 17. Thus, the optical head 8 is moved in the radial direction of the optical disc 1.

In case of using a recordable magnetooptic disc as an optical disc 1, as mentioned above, address data serving as absolute position information has previously been recorded along the pregrooves of the magnetooptic disc by wobbling on the pregrooves. In case of a read only optical disc, a plurality of pits wobble in the radial direction of the disc, so that the address data has previously been recorded. A push-pull signal of the RF amplifier 10 is supplied to an address demodulating circuit 18. In the address demodulating circuit 18, address information which has previously been recorded on the optical disc 1 is demodulated.

The reproduction RF signal from the RF amplifier 10 is supplied to the EFM and ACIRC decoder 20. In the EFM and ACIRC decoder 20, an EFM demodulating process and an error correcting process by ACIRC are executed to the reproduction RF signal.

An output of the EFM and ACIRC decoder 20 is once written in an RAM 22 under a control of a memory controller 21. The reading operation of the data from the optical disc 1 by the optical head 8 and the transfer of digital data in a system from the optical head 8 to the RAM 22 are performed at a transfer rate of 1.41 Mbits/sec.

The data written in the RAM 22 is read out at a timing of a transfer rate of 0.3 Mbits/sec and is supplied to an audio compression and decompression decoder 23. In the compression and decompression decoder 23, a decompressing process is performed to the data read out from the RAM 22.

The writing or reading operation of the data into/from the RAM 22 is executed by designating a write address or read address by controlling a write pointer or a read pointer by the memory controller 21. As mentioned above, a transfer rate of the digital data read out from the optical disc 1 is equal to 1.41 Mbits/sec and the write pointer is increased at a timing of 1.41 Mbits/sec. On the other hand, a reading transfer rate of the digital data from the RAM 22 is equal to 0.3 Mbits/sec and the read pointer is increased at a timing of 0.3 Mbits/sec. Data is accumulated into the RAM 22 by a difference between the writing and reading transfer rates.

The memory controller 21 stops the increment of the write pointer at a time point when the data of a predetermined amount or more has been accumulated in the RAM 22 and the system controller 7 stops the reading operation of the data from the optical disc 1 by the optical head 8. For this period of time, the increment of the read pointer is continuously executed by the memory controller 21.

Only the reading operation from the RAM 22 is continued and an analog audio signal is outputted from an output terminal 25. When a data accumulation amount in the RAM 22 is equal to or less than a predetermined amount at a certain time point, the data reading operation on a cluster unit basis from the optical disc 1 by the optical head 8 is restarted by the system controller 7, the increment of the write pointer by the memory controller 21 is restarted, and the data is again accumulated into the RAM 22.

Only a predetermined amount of data is accumulated into the RAM 22 and the reading operation of the data from the optical disc 1 by the optical head 8 is stopped. The above operation is repeated until the reading operation of the whole data recorded on the optical disc 1 is finished or until the reading operation of programs such as designated music pieces or the like is finished.

An output of the compression and decompression decoder 23 is supplied to a D/A converter 24. The digital audio signal outputted from the decoder 23 is converted into the analog audio signal by the D/A converter 24. The analog audio signal is outputted from the output terminal 25.

The whole operation of the reproducing apparatus according to the first embodiment is controlled and managed by the system controller 7. An input from any operated one of a plurality of input keys 26 is supplied to the system controller 7. A plurality of input keys 26 include, for example, a play key, a stop key, an AMS key, a search key, and the like. An output of the system controller 7 is supplied to a display 27. Various setting states are displayed on the display 27 and information, reproduction elapsed time, and the like regarding the names of music pieces read out from an area where index information of the optical disc 1 has been recorded are also displayed.

In the disc reproducing apparatus according to the first embodiment, the reading operation of the data from the optical disc 1 is intermittently performed. While the data is read out from the optical disc 1 by using the optical head 8, the switching circuit 4 is switched to the terminal 4A side by the system controller 7 and the spindle motor 2 is controlled so as to rotate the optical disc 1 at a constant linear velocity. The address data extracted from the pregrooves which have previously been formed on the optical disc 1 and wobble in the radial direction of the disc is demodulated by the address demodulating circuit 18 and supplied to the CLV servo circuit 5. The address data extracted from the tracks comprising a plurality of pits which have previously been formed on the optical disc 1 and wobble in the radial direction of the disc is supplied to the CLV servo circuit 5 through the demodulating circuit 18. In the CLV servo circuit 5, the bit clocks extracted from the output of the EFM and ACIRC decoder 20 are compared with a reference clock. On the basis of a comparison result, a CLV control signal is formed and supplied to the spindle motor 2 so that the optical disc 1 is controlled so as to rotate at a constant linear velocity.

The digital data read out from the optical disc 1 is subjected to the demodulation and error correcting process by the EFM and ACIRC circuit 20 and is supplied to the RAM 22 through the memory controller 21 and is accumulated into the memory 22. When a capacity in the RAM 22 is equal to or larger than a predetermined amount, the reading operation of the data from the optical disc 1 is interrupted as mentioned above and the apparatus enters a standby mode. In the standby mode, to reduce an electric power consumption, the operations of the portions other than the memory controller 21, RAM 22, audio compression and decompression decoder 23, and D/A converter 24 are stopped. At the same time, when the apparatus enters the standby mode, the switching circuit 4 is switched to the terminal 4B side by a CAV/CLV control signal from the system controller 7.

The CAV/CLV control signal which is outputted from the system controller 7 is supplied to the CAV servo circuit 6. The CAV servo circuit 6 has a register 6b to fetch a period of the FG signal just before the control mode is switched from the constant linear velocity control to the constant angular velocity control. When the CAV/CLV control signal is supplied to the CAV servo circuit 6, the period of the FG signal which is obtained just before the switching from the CLV servo circuit 5 to the CAV servo circuit 6 and is detected by the detector 2a is fetched into the register 6b. When the switching circuit 4 is switched to the terminal 4B side, the rotation of the spindle motor 2 is controlled by the CAV servo circuit so as to rotate the optical disc 1 at a constant angular velocity on the basis of the period of the FG signal which was fetched into the register and was obtained just before the switching from the CLV servo circuit 5 to the CAV servo circuit 6.

Figure 3:
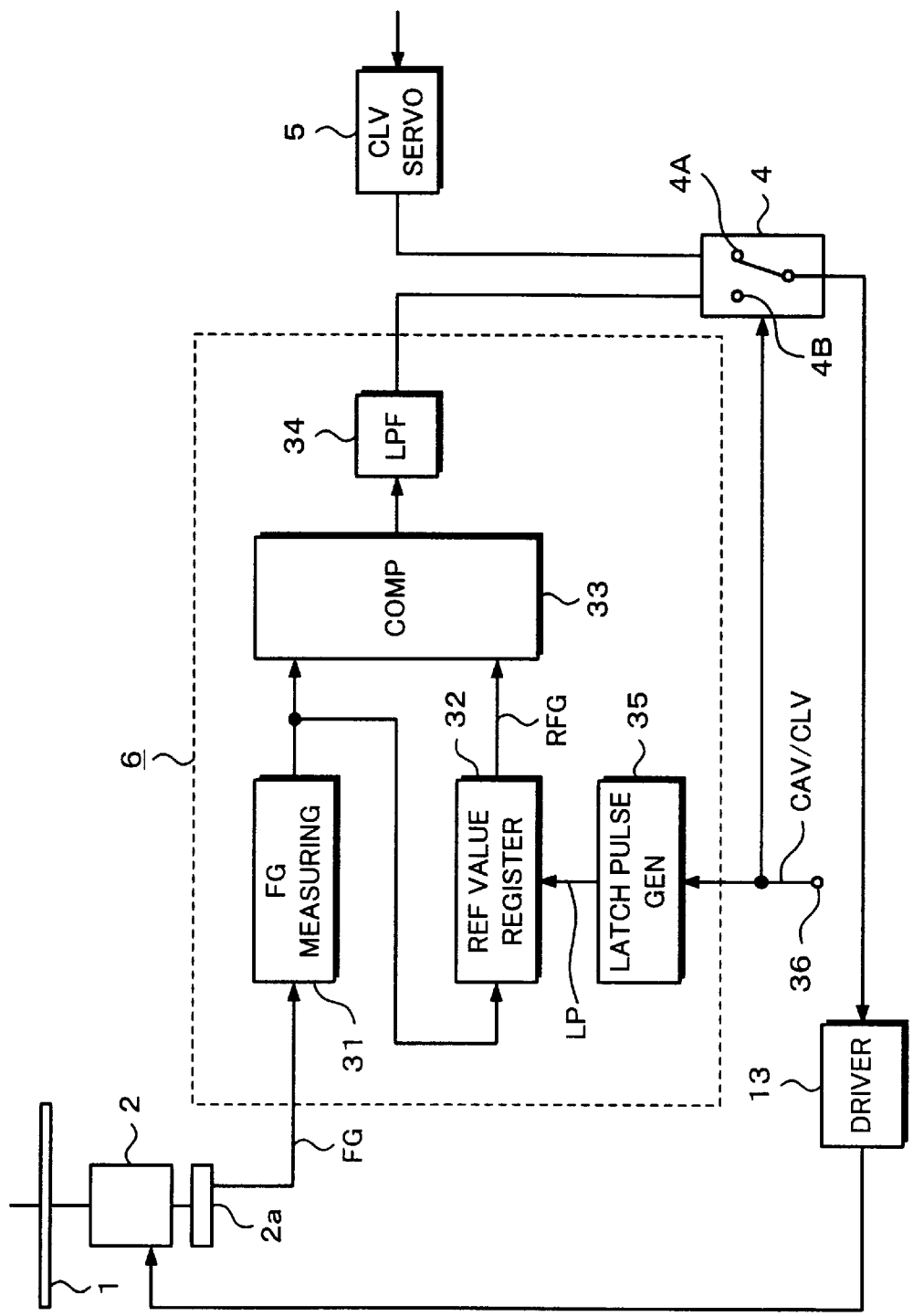
FIG. 3 is a block diagram showing a construction of a CAV servo circuit of the disc reproducing apparatus according to the first embodiment.

As shown in FIG. 3, the CAV servo circuit 6 comprises: an FG period measuring circuit 31 for measuring the period of the FG signal from the detector 2a to detect the rotation of the spindle motor 2; a reference value register 32; a comparing circuit 33; and a low pass filter 34. A latch pulse generating circuit 35 is also provided. The CAV/CLV control signal from the system controller 7 is supplied to the latch pulse generating circuit 35 through a terminal 36.

The servo circuit is switched from the CLV servo circuit 5 to the CAV servo circuit 6 by the CAV/CLV control signal from the terminal 36, namely, the switching circuit 4 is switched from the terminal 4A side to the terminal 4B side and a latch pulse LP is generated from the latch pulse generating circuit 35. By the latch pulse LP, the period of the FG signal just before the switching to the CAV servo circuit 6 when the optical disc 1 is controlled so as to rotate at a constant linear velocity so far is supplied to the reference value register 32. That is, speed information of the optical disc 1 just before the switching to the CAV servo circuit 6 when the optical disc 1 is controlled so as to rotate at a constant linear velocity is detected by the FG period measuring circuit 31. An output of the FG period measuring circuit 31 is fetched into the reference value register 32.

The FG signal is generated from the detector 2a of the spindle motor 2 in accordance with the rotational speed of the spindle motor 2. The FG signal is supplied to the FG period measuring circuit 31. The period of the FG signal is measured by the FG period measuring circuit 31 from the period of the FG signal. The rotational speed of the spindle motor 2 is detected. An output of the FG period detecting circuit 31 is supplied to the comparing circuit 33.

An output of the reference value register 32 is supplied to the comparing circuit 33. The period RFG of the FG signal just before the switching to the CAV servo circuit 6 when the optical disc 1 is controlled so as to rotate at a constant linear velocity has been accumulated in the reference value register 32. In the comparing circuit 33, the period RFG of the FG signal just before the switching to the CAV servo circuit 6 when the optical disc 1 is controlled so as to rotate at a constant linear velocity is compared with the present period of the FG signal which is outputted from the detector 2a of the spindle motor 2, thereby obtaining a speed error and a phase error. An output of the comparing circuit 33 is supplied to the spindle motor 2 through the low pass filter 34, switching circuit 4, and driving circuit 13.

In FIG. 2, in the foregoing standby mode, the reading operation of the data from the optical disc 1 is interrupted and the operation to read out the data stored in the RAM 22 from the RAM 22 is continued. When an amount of data stored in the RAM 22 is equal to or less than a predetermined value, the reading operation of the data from the optical disc 1 is restarted.

When the reading operation of the data from the optical disc 1 is restarted, the operations of the various servo circuits such as focusing servo circuit 12, tracking servo circuit 14, thread servo circuit 16, laser controller 11, and the like whose operations have been stopped for a period of time in the standby mode and the operation of the processing circuits of the reproduction signal of the EFM and ACIRC decoder 20 and the like are restarted. The switching circuit 4 is switched to the terminal 4A side by the CAV/CLV control signal from the system controller 7.

When the switching circuit 4 is switched to the terminal 4A side, the optical disc 1 is again rotated at a constant linear velocity. In the state just before the optical disc 1 is controlled so as to again rotate at a constant linear velocity, the optical disc 1 is rotated at a constant angular velocity by the CAV servo circuit 6. When the rotation of the optical disc 1 is controlled at a constant angular velocity, the period RFG of the FG signal when the optical disc 1 is controlled so as to rotate at a constant linear velocity until the apparatus enters the standby mode is compared with the period of the FG signal which is outputted from the detector 2a of the spindle motor 2 and the rotational speed of the optical disc 1 is controlled. Therefore, the rotational speed of the optical disc 1 is equal to the rotational speed of the optical disc 1 when its rotation is controlled at a constant linear velocity just before the switching to the standby mode. Therefore, a speed difference hardly occurs between the rotational speed of the optical disc 1 when the optical disc 1 is controlled so as to rotate at a constant angular velocity in the standby mode and the rotational speed of the optical disc 1 by the CLV servo circuit 5 when the reading operation of the optical disc is restarted. Consequently, when the control mode is shifted from a state where the optical disc 1 is controlled so as to rotate at a constant angular velocity in the standby mode to a state where the optical disc is controlled so as to rotate at a constant liner velocity and the reading operation of the data from the optical disc 1 is restarted, a situation such that a large electric power to drive and control the spindle motor 2 is consumed can be prevented.

Figure 4:
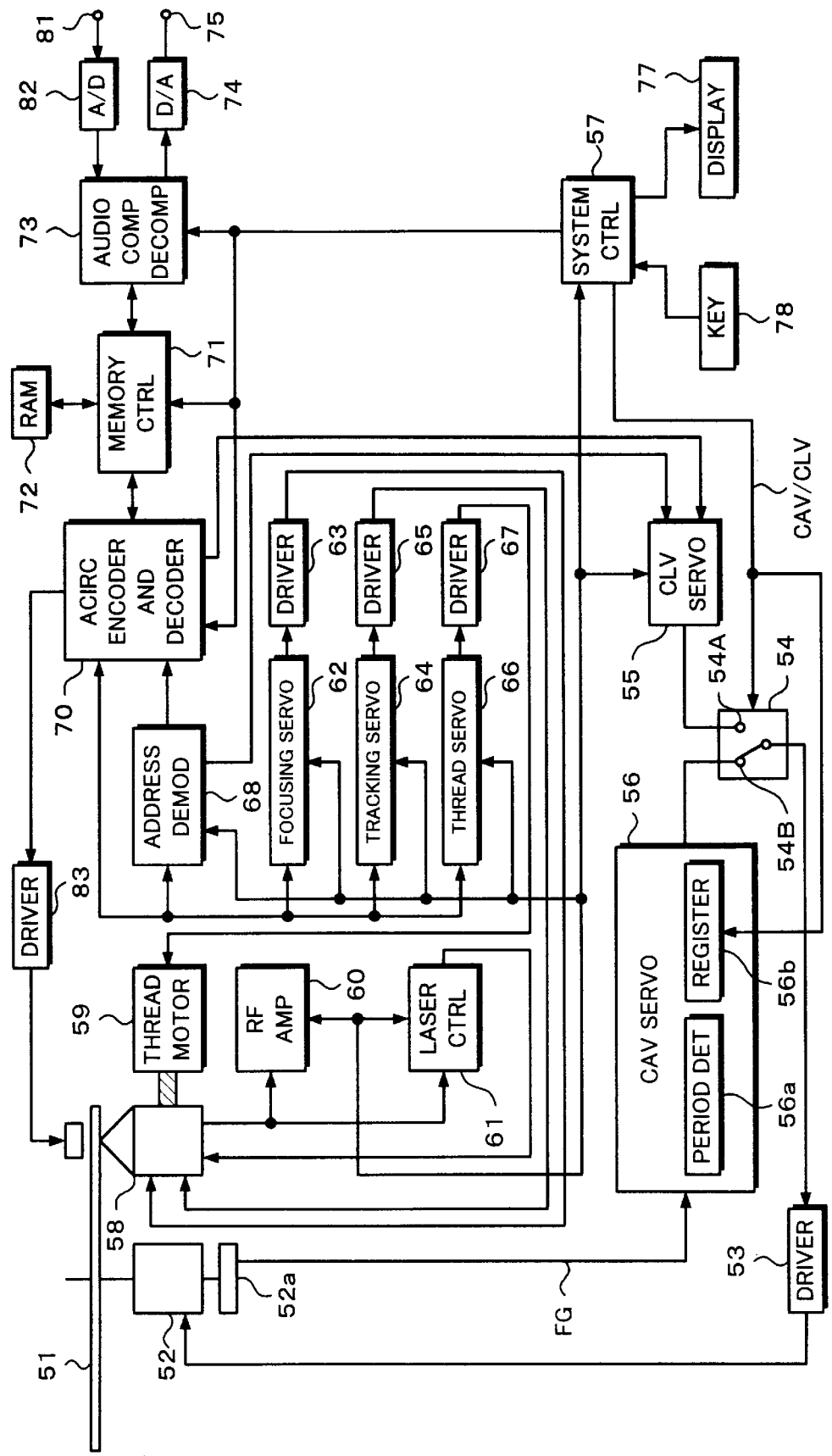
FIG. 4 is a block diagram showing a construction of a disc recording and/or reproducing apparatus according to the second embodiment of the invention.

FIG. 4 shows a recording and/or reproducing apparatus according to the second embodiment of the invention.

In FIG. 4, the optical disc 51 is a recordable magnetooptic disc and compressed audio data has been recorded at a constant linear velocity along the pregrooves which wobble in the radial direction of the disc as mentioned above. As shown in FIG. 4, the optical disc 51 is rotated at a constant linear velocity by a spindle motor 52. For example, a brushless motor is used as a spindle motor 52. A driving current is supplied as a driving signal from a driving circuit 53 to the spindle motor 52. A spindle control signal is supplied to the brushless motor 52 through the spindle motor and the driving circuit 53 of the embodiment 1.

Similarly, a rotation detector 52a to detect the rotation of the spindle motor is provided.

When the recording or reading operation of data is performed, the optical disc 51 is rotated at a constant linear velocity by the spindle motor 52. When the recording or reading operation of data is not performed, the optical disc 51 is rotated at a constant angular velocity. When data recording or reading operation is performed, a CLV servo circuit 55 is provided to rotate the optical disc 51 so as to rotate at a constant linear velocity. When data recording or reading operation is not performed, a CAV servo circuit 56 is provided to rotate the optical disc 51 so as to rotate at a constant angular velocity.

An output of the CLV servo circuit 55 is supplied to a terminal 54A of a switching circuit 54. An output of the CAV servo circuit 56 is supplied to a terminal 54B of the switching circuit 54. A CLV/CAV control signal is supplied from a system controller 57 to the switching circuit 54, so that the switching circuit 54 is switched to either the terminal 54A or the terminal 54B. An output of the switching circuit 54 is supplied to the spindle motor 52 through the driving circuit 53.

An optical head 58 is provided for the recording and/or reproducing apparatus according to the second embodiment so as to face one of the surfaces of the optical disc 51. The optical head 58 comprises: a laser diode for emitting a laser beam to record or reproduce data to/from the optical disc 51; an optical system constructed by a polarization beam splitter, an objective lens for converging the laser beam emitted from the laser diode onto a signal recording surface of the optical disc 51, and the like; and a detector to detect the reflected light from the optical disc. An actuator is provided for the optical head 58. The objective lens of the optical head 58 is moved by the actuator in the focusing direction and the tracking direction in a manner similar to the foregoing first embodiment.

A magnetic head 84 is provided at a position opposite to the optical head 58 so as to face the surface on the opposite side of the optical disc 51 while sandwiching the optical disc 51. The magnetic head 84 applies a perpendicular magnetic field modulated by the data to be recorded in the optical disc 51 onto the optical disc 51. Although not shown, the optical head 58 and magnetic head 84 are mechanically coupled. The whole optical head 58 and whole magnetic head 84 are moved in the radial direction of the optical disc 51 by a feed motor 59.

A laser beam is emitted from a laser diode of the optical head 58 and is reflected by a recording layer serving as a signal recording surface of the optical disc 51 and is detected by a detector. A part of the laser beam emitted from the laser diode is detected by a detector for monitoring. An output signal from the monitoring detector is supplied to a laser controller 61. An output level of the output light of the laser beam which is emitted from the laser diode is controlled by the laser controller 61 so as to be constant. The laser controller 61 controls so as to raise the output level of the laser beam which is emitted from the laser diode in order to heat the recording layer of the optical disc 1 to the Curie temperature or higher in the recording mode and to reduce the output level of the laser beam to a level lower than the output level upon recording.

An output signal from each detecting unit of the detector of the optical head 58 is supplied to an RF amplifier 60. By arithmetically operating the output signal from each detecting unit of the detector of the optical head 58 by the RF amplifier 60, a reproduction RF signal, a tracking error signal, and a focusing error signal are formed. The following various servo processes are executed by each of those error signals.

That is, the focusing error signal formed by the RF amplifier 60 is supplied to a focusing servo circuit 62. The focusing servo circuit 62 forms a focusing control signal on the basis of the supplied focusing error signal. The formed focusing control signal is supplied to the actuator of the optical head 58 through a driving circuit 63. Thus, the objective lens of the optical head 58 is moved in the focusing direction as a direction to set off the focusing errors.

The tracking error signal formed by the RF amplifier 60 is supplied to a tracking servo circuit 64. The tracking servo circuit 64 forms a tracking control signal on the basis of the supplied tracking error signal. The formed tracking control signal is supplied to the actuator of the optical head 58 through a driving circuit 65. Thus, the objective lens of the optical head 58 is moved in the tracking direction as a direction to set off the tracking error.

A low band signal component of the tracking error signal formed by the RF amplifier 60 is supplied to a thread servo circuit 66. The thread servo circuit 66 forms a thread control signal on the basis of a low band signal component of the supplied tracking error signal. The thread control signal is supplied to the feed motor 59 through a driving circuit 67. Thus, the optical head 58 and magnetic head 84 are moved in the radial direction of the optical disc 51.

The whole operation of the recording and/or reproducing apparatus is controlled and managed by the system controller 57. An input corresponding to a key operated by the user among a plurality of input keys 76 is supplied to the system controller 57. A plurality of input keys 76 comprises, for example, a record key, play key, a stop key, an AMS key, a search key, and the like. An output of the system controller 57 is supplied to a display 77. Various setting states are displayed on the display 77 and the names of music pieces read out from an area where index information of the optical disc 51 has been recorded, recordable remaining time, and recording or reproduction elapsed time are also displayed.

When data is recorded onto the optical disc 51, an analog audio signal from a microphone, an external equipment, or the like is supplied to an input terminal 81. The analog audio signal is supplied to an A/D converter 82. The analog audio signal is converted into a digital audio signal by the A/D converter 82 on the basis of, for example, a sampling frequency of 44.1 kHz, the number of quantization bits of 16 bits, and two right and left channels.

The digital audio signal outputted from the A/D converter 82 is supplied to an audio compression encoder/decoder 73. The audio compression encoder/decoder 73 compresses the digital audio signal on the basis of MDCT. In the encoder/decoder 73, the inputted digital audio signal is divided into three frequency bands of a high band, a middle band, and a low band in order to avoid a pre-echo. The digital audio signal divided into three frequency bands is cut out into 512 samples (time window of every up to 11.6 msec) and is converted into spectrum data by MDCT. After the spectrum data was normalized every coding unit, it is quantized. Thus, the inputted digital audio signal becomes the digital data which was compressed into about ⅕.

The digital data outputted from the audio compression encoder/decoder 73 is temporarily accumulated into an RAM 72 under a control by a memory controller 71. A writing rate of the digital data into the RAM 72 is equal to 0.3 Mbits/sec. When data of a predetermined amount or more is accumulated in the RAM 72, the data is read out from the RAM 72. The data read out from the RAM 72 is supplied to an EFM and ACIRC encoder/decoder 70. A reading rate of the digital data from the RAM 72 is equal to 1.41 Mbits/sec.

A predetermined writable area of the digital data is always assured in the RAM 72 due to a difference between the writing rate of the digital data into the RAM 72 and the reading rate of the digital data from the RAM 72 when recording to the disc. Therefore, if a track jump or the like occurs, a scanning point of the optical head 58 can be returned.

The data is read out from the RAM 72 on a cluster unit basis and is recorded onto the optical disc.

An error correction coding is performed to the data read out from the RAM 72 and the data is EFM modulated by the EFM and ACIRC encoder/decoder 70. The recording data outputted from the EFM and ACIRC encoder/decoder 70 is supplied to the magnetic head 84 through a driving circuit 83. Thus, the perpendicular magnetic field modulated on the basis of the recording data is supplied from the magnetic head 84 to the optical disc 51.

Upon reproduction, the reproduction RF signal from the RF amplifier 60 is supplied to the EFM and ACIRC encoder/decoder 70. In the EFM and ACIRC encoder/decoder 70, an EFM demodulating process and an error correcting process by ACIRC are executed to the reproduction RF signal.

An output of the EFM and ACIRC encoder/decoder 70 is temporarily written into the RAM 72 under a control of the memory controller 71. A transfer rate upon writing of the data read out from the optical disc into the RAM 72 when the optical disc 51 is reproduced is equal to 1.41 Mbits/sec and a reading transfer rate of the data written in the RAM 72 from the RAM 72 is equal to 0.3 Mbits/sec. Therefore, the data is accumulated into the RAM 72 due to a difference between the writing and reading bit rates. When the data of a predetermined amount or more is accumulated in the RAM 72, the reading operation of the data from the optical disc 51 is interrupted and only the reading operation of the data stored in the RAM 72 is executed. When a data accumulation amount in the RAM 72 is equal to or less than a predetermined amount, the reading operation of the data from the optical disc 51 is restarted and the data read out from the optical disc 51 is written into the RAM 72.

An output of the RAM 72 is supplied to the audio compression encoder/decoder 73. In the audio compression encoder/decoder 73, a decompressing process of the digital data outputted from the encoder/decoder 70 is executed. An output of the audio compression encoder/decoder 73 is supplied to a D/A converter 74. The digital audio signal is converted into the analog audio signal by the D/A converter 74. The analog audio signal is outputted from an output terminal 75.

Upon recording to the optical disc 51, data is temporarily stored into the RAM 72 until an amount of data which is supplied from the encoder/decoder 73 and is written into the RAM 72 is equal to a predetermined amount. For this period of time, the recording of the data to the optical disc 51 is not performed. When an amount of data written in the RAM 72 is equal to the predetermined amount, the data is read out from the RAM 72 on a cluster unit basis and the data is recorded onto the optical disc 51. As mentioned above, the recording operation of the data to the optical disc 51 is intermittently performed.

Upon reproduction of the optical disc 51, the digital data outputted from the EFM and ACIRC encoder/decoder 70 is temporarily written in the RAM 72. When the data of a predetermined amount or more is accumulated in the RAM 72, the reading operation of the data from the optical disc 51 is interrupted, the writing operation of the data into the RAM 72 is also interrupted, and only the reading operation of the data from the RAM 72 is performed. When a data accumulation amount in the RAM 72 is equal to or less than a predetermined amount, the data reading operation from the optical disc 51 on a cluster unit basis is restarted. In this manner, the reading operation of the data from the optical disc 51 is intermittently performed.

While the recording of the data to the optical disc 51 is interrupted upon recording and while the reading operation of the data from the optical disc 51 is interrupted upon reproduction, the apparatus enters the standby mode. In the standby mode, the operations of the portions other than the memory controller 71, RAM 72, audio compression encoder/decoder 73, A/D converter 82, and D/A converter 24 are stopped. At the same time, while the data recording to the optical disc 51 and the data reading from the optical disc 51 are executed, the switching circuit 54 is switched to the terminal 54A side by the system controller 57 and the optical disc 51 is rotated at a constant linear velocity. When the apparatus enters the standby mode, the switching circuit 54 is switched to the terminal 54B side by the CAV/CLV control signal from the system controller 57 and the optical disc 51 is rotated at a constant angular velocity.

At the same time, the CAV/CLV control signal from the system controller 57 is also supplied to the CAV servo circuit 56.

In a manner similar to the CAV servo circuit 6 in the foregoing first embodiment, the CAV servo circuit 56 comprises: a period detecting unit 56a to detect a period of the FG signal which is generated from the rotation detector 52a; and a register 56b to fetch the period of the FG signal which is outputted from the rotation detector 52a just before the servo circuit is switched from the CLV servo circuit 55 to the CAV servo circuit 56. When the CAV/CLV control signal is supplied to the CAV servo circuit 56, the period of the FG signal just before the switching from the CLV servo circuit 55 to the CAV servo circuit 56 is fetched into the register 56b. When the switching circuit 54 is switched to the terminal 54B side, the rotation of the spindle motor 52 is controlled by the CAV servo circuit 56 so as to rotate the disc at a constant angular velocity on the basis of the period of the FG signal which has been held in the register 56b and is obtained just before the switching from the CLV servo circuit 55 to the CAV servo circuit 56.

When the writing or reading operation of data to/from the optical disc 1 is restarted, the power voltages are again supplied to the various servo circuits such as focusing servo circuit 62, tracking servo circuit 64, thread servo circuit 66, laser controller 61, and the like whose operations have been stopped for the period of time in the standby mode and the processing circuits of the reproduction signal such as an EFM and ACIRC encoder/decoder 70 and the like whose operations have also been stopped, so that their operations are restarted. The switching circuit 54 is switched from the terminal 54B to the terminal 54A side by the CAV/CLV control signal from the system controller 57.

When the switching circuit 54 is switched to the terminal 54A side, the optical disc 51 is again rotated at a constant linear velocity. When the optical disc 51 is again rotated at a constant linear velocity, the rotational speed of the optical disc 51 is equal to the linear velocity of the optical disc 51 at a time point when it is rotated at a constant linear velocity just before the switching from the CLV servo circuit 55 to the CAV servo circuit 56 before the standby mode. Therefore, the rotational speed of the optical disc 51 at a time point when the rotation of the optical disc 51 is switched from the rotation of a constant angular velocity to the rotation of a constant linear velocity and the rotation at a constant linear velocity of the optical disc 51 is restarted is almost equal to the rotational speed of the optical disc 51 when it is rotated at a constant linear velocity and where the optical disc 51 is scanned in case of continuously recording or reading the data to/from the optical disc 51.

The example to which the invention is applied to the read only MD player and the recordable/reproducible MD player has been described above. However, the invention can be also similarly applied to a CD player in which a buffer memory is equipped and reproduction data from the optical disc is once stored into a buffer memory.

A disc reproducing apparatus according to the third embodiment of the invention will now be described hereinbelow with reference to FIG. 5 and subsequent drawings. In the disc reproducing apparatus according to the third embodiment, which will be explained hereinbelow, a construction of a CAV servo circuit 206 differs from the CAV servo circuit 6 of the foregoing first embodiment and the other portions are constructed in a manner similar to those in the foregoing first embodiment. The portions common to those in the first embodiment are designated by the same reference numerals and their descriptions are omitted here.

Figure 5:
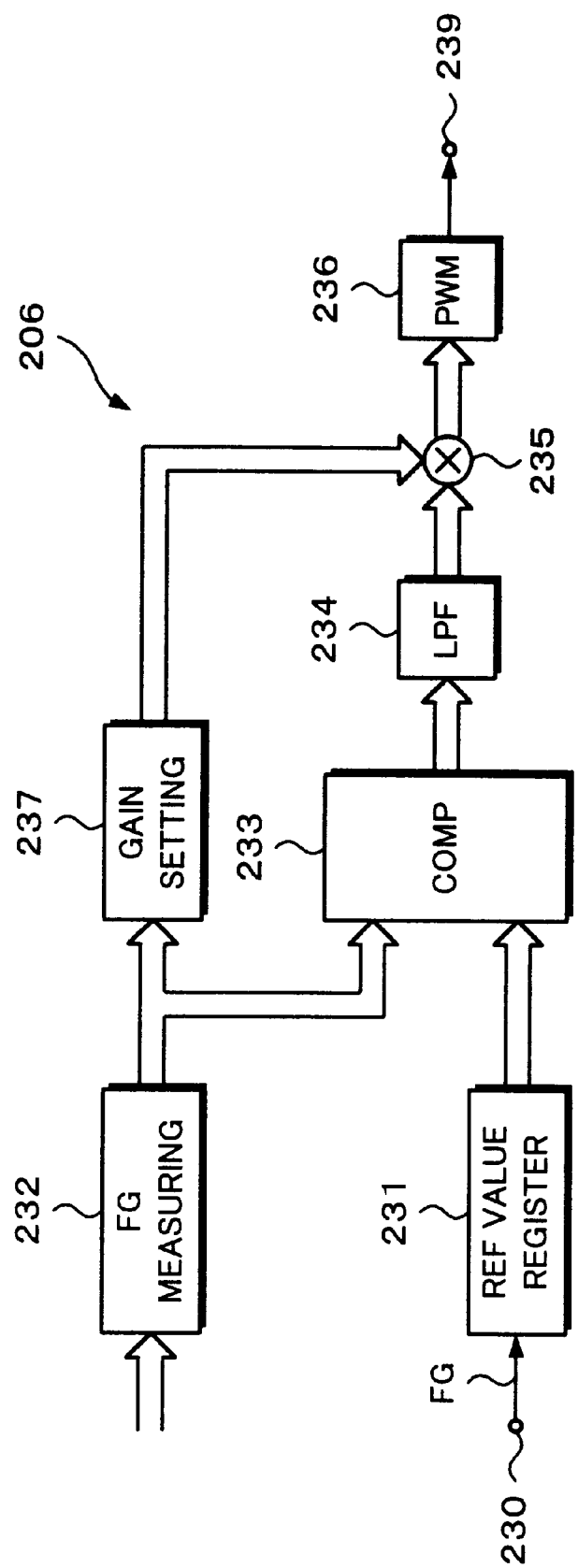
FIG. 5 is a block diagram showing a construction of a CAV servo circuit of a disc reproducing apparatus according to the third embodiment of the invention.

FIG. 5 shows a construction of the CAV servo circuit 206 according to the third embodiment. In the CAV servo circuit 206, the apparatus is set into the standby mode and when the rotation of the spindle motor 2 is controlled so as to rotate the disc at a constant angular velocity, the gain is set to the optimum gain in accordance with the rotational speed of the disc.

In FIG. 5, the CAV servo circuit 206 comprises: an FG period measuring circuit 231 to measure the period of the FG signal generated from the detector 2a of the spindle motor 2; a reference value register 232 to set the FG period corresponding to the target rotational speed; a comparing circuit 233 to compare the target value set in the reference value register 232 with the present FG period; a low pass filter 234; a multiplying circuit 235 to set a gain; and a PWM control circuit 236 to form a PWM signal whose pulse width changes in accordance with an output signal from the multiplying circuit 235. In the CAV servo circuit 206, a gain setting circuit 237 to set a gain in accordance with the rotational speed of the optical disc 1 is provided.

In a manner similar to the foregoing first embodiment, when the disc reproducing apparatus enters the standby mode, the spindle motor 2 is switched to the control of the rotation at a constant angular velocity and the switching circuit 4 is switched from the terminal 4A side to the terminal 4B side. In the system controller 7, the optimum reference value when the spindle motor 2 is controlled so as to rotate the disc at a constant angular velocity is obtained on the basis of the address data or the like when the disc is scanned by the optical head 8. The reference value is set into the reference value register 232. The reference value which is set by the system controller 7 is set to a value such as to minimize a speed difference between the rotational speed of the spindle motor 2 at a time point when it is controlled so as to rotate the disc at a constant linear velocity before the switching to the CAV servo circuit 206 and the rotational speed when the servo circuit is switched to the CAV servo circuit 206.

An output of the reference value register 232 is supplied to the gain setting circuit 237. The gain setting circuit 237 sets the optimum gain to rotate the spindle motor 2 in accordance with the rotational speed of the optical disc 1, namely, the rotational speed of the spindle motor 2. The rotational speed of the optical disc 1 is set in accordance with the reference value in the reference value register 232.

That is, the gain which is set by the gain setting circuit 237 is large when the rotational speed of the optical disc 1 is high in the inner rim portion of the optical disc 1. As the rotational speed of the optical disc becomes slower in the outer rim portion of the optical disc 1, the gain is set to be smaller. In other words, the gain which is inversely proportional to the rotational speed of the optical disc 1, namely, the rotational speed of the spindle motor 2 is set by the gain setting circuit 237.

The FG signal is generated from the detector 2a of the spindle motor 2 in accordance with the rotational speed of the spindle motor 2. The FG signal is supplied to the FG period measuring circuit 231 through an input terminal 230. The period of the FG signal is measured by the FG period measuring circuit 231. From the measured period of the FG signal, the rotational speed of the spindle motor 2 is detected. An output of the FG period measuring circuit 231 is supplied to the comparing circuit 233.

A period serving as a reference value to set the rotational speed of the disc into a target rotational speed of the disc is supplied from the reference value register 232 to the comparing circuit 233. The rotational period of the spindle motor 2 detected by the FG period detecting circuit 231 is also supplied to the comparing circuit 233. In the comparing circuit 233, the reference period from the reference value register 232 is compared with the present period of the FG signal of the spindle motor 2, so that a speed error and a phase error are obtained. An output of the comparing circuit 233 is supplied to the multiplying circuit 235 through the low pass filter 234.

The gain which is inversely proportional to, for example, the rotational speed as mentioned above is supplied from the gain setting circuit 237 to the multiplying circuit 235. The gain which is supplied from the gain setting circuit 237 is set in accordance with the rotational speed of the optical disc 1 as mentioned above. The gain according to the rotational speed of the optical disc 1 from the gain setting circuit 237 is multiplied to an output of the low pass filter 234 by the multiplying circuit 235. An output of the multiplying circuit 235 is outputted from an output terminal 239 through the PWM control circuit 236. The rotation of the spindle motor 2 is controlled by a PWM control signal which is formed on the basis of an output of the multiplying circuit 235.

As mentioned above, in the disc reproducing apparatus according to the third embodiment, the gain setting circuit 237 to set the gain in accordance with the rotational speed of the optical disc 1 is provided for the CAV servo control circuit 206. Thus, the gain can be set to the optimum servo gain of the spindle motor 2 which rotates at a constant angular velocity in the standby mode.

In the foregoing third embodiment, the gain when the rotation is controlled at a constant angular velocity is controlled in accordance with the rotational speed of the optical disc 1. However, even when the control mode is switched to the mode to control the rotation at a constant linear velocity, the gain can be also controlled in accordance with the rotational speed of the spindle motor 2.

Figure 6:
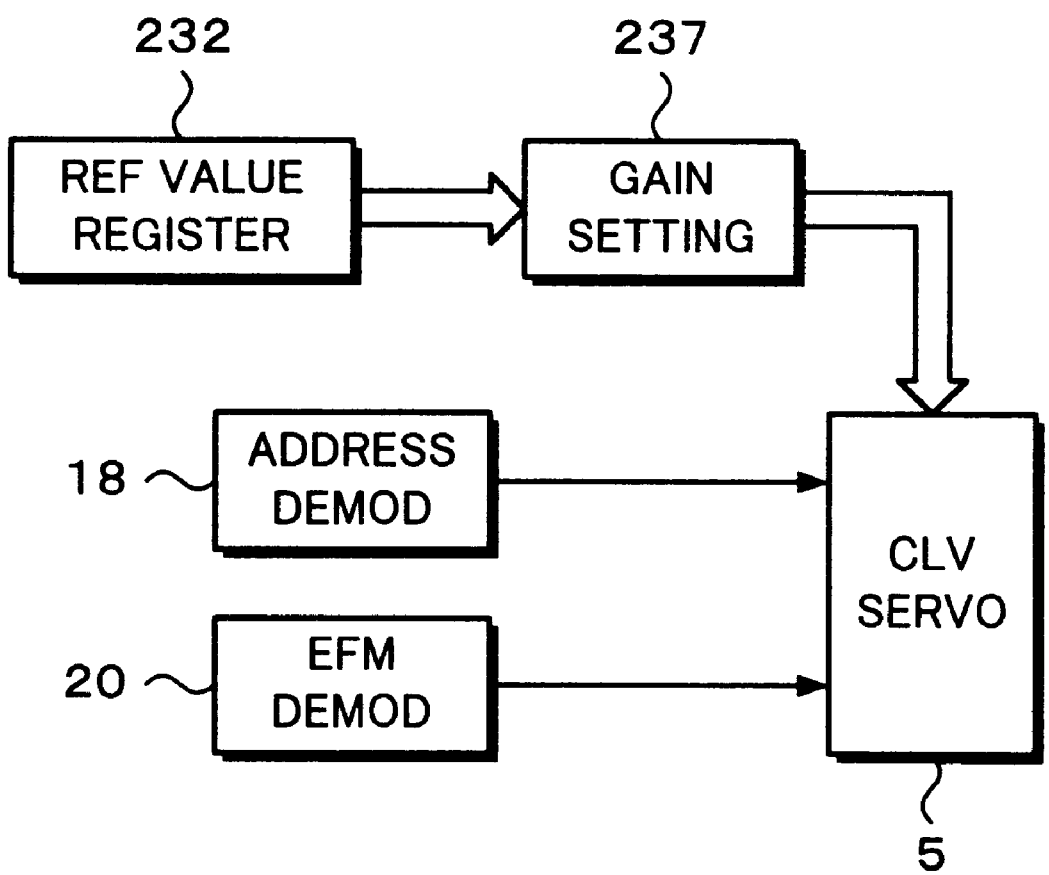
FIG. 6 is a block diagram showing a modification of a CAV servo circuit of the disc reproducing apparatus according to the third embodiment.

That is, as shown in FIG. 6, the gain obtained by the gain setting circuit 237 from the output of the reference value register 232 is sent to the CLV servo circuit 5. In a manner similar to the foregoing first embodiment, when the apparatus finishes the standby mode, it is set to the mode to again read out the data from the optical disc 1 and the control mode of the spindle motor 2 is switched to the control mode to rotate the spindle motor at a constant linear velocity. In this instance, the gain of the CLV servo circuit 5 is set by the gain according to the rotational speed of the disc obtained by the gain setting circuit 237 from the output of the reference value register 232 when the optical disc 1 is rotated at a constant angular velocity. With this method, the stable servo of the spindle motor 2 is executed not only when the rotation is controlled by the CAV servo circuit 206 but also when the control mode is shifted to the mode in which the rotation is controlled by the CLV servo circuit 5.

In the example shown in FIG. 5, when the apparatus enters the standby mode and the servo circuit is switched from the CLV servo circuit 5 to the CAV servo circuit 206, the optimum reference value at a time point when the rotation is controlled at a constant angular velocity by the system controller 7 is obtained from the scanning position of the optical disc and is set into the reference value register 222. However, if the period of the FG signal just before the control mode is shifted to the mode to control the rotation at a constant angular velocity is used as a reference value, the optical disc 1 can be rotated at almost the same speed as the rotational speed at a time point when the rotation has been controlled at a constant linear velocity. With this method, the process to obtain the optimum reference value when the rotation is controlled at a constant angular velocity by the system controller 7 is unnecessary.

Figure 7:
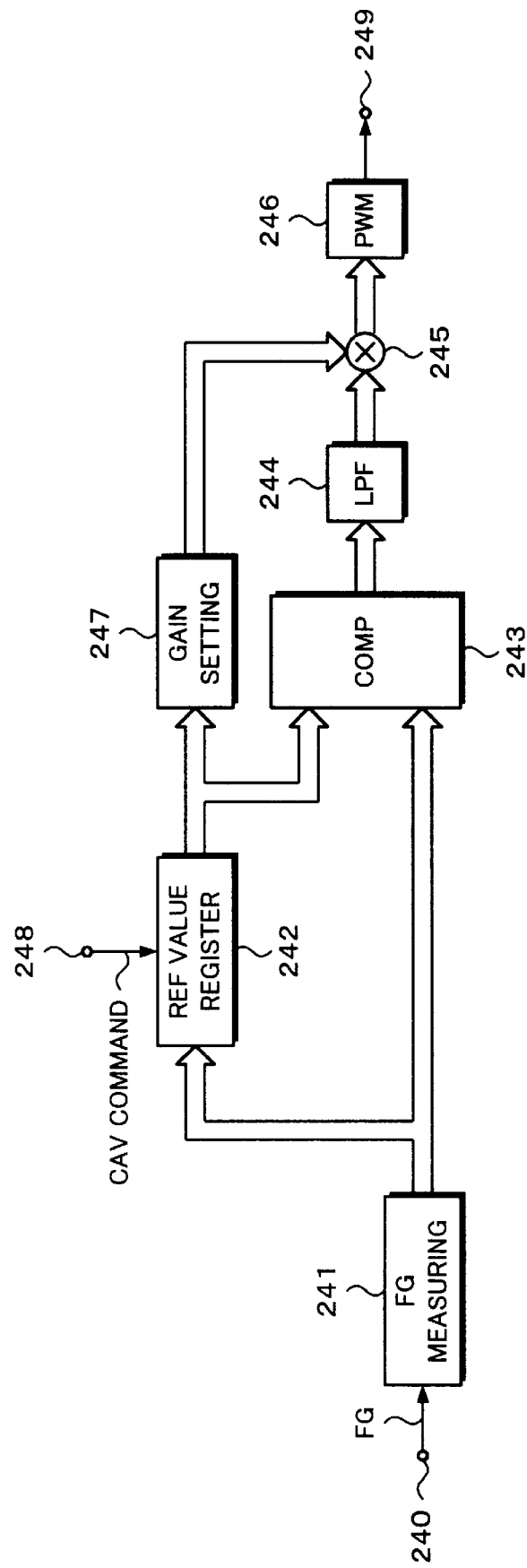
FIG. 7 is a block diagram showing a construction of a CAV servo circuit of a disc reproducing apparatus according to the fourth embodiment of the invention.

FIG. 7 shows a construction of a disc reproducing apparatus according to the fourth embodiment in which the rotational speed of the disc when switching to the mode to control the rotation at a constant angular velocity is set as mentioned above.

In a manner similar to the foregoing third embodiment, the disc reproducing apparatus according to the fourth embodiment is also constructed in a manner similar to the disc reproducing apparatus according to the first embodiment mentioned above except for a construction of a CAV servo circuit 216 and portions common to those in the first embodiment are designated by the same reference numerals and the description regarding the first embodiment is used as a detailed explanation of each section.

In FIG. 7, the FG signal according to the rotation of the spindle motor 2 is supplied from the detector 2a through an input terminal 240. A period of the FG signal is calculated by an FG period measuring circuit 241. When the apparatus enters the foregoing standby mode, the control mode of the spindle motor 2 is switched from the control by the CLV servo circuit 5 to the control by the CAV servo circuit 216. In this instance, the switching circuit 4 shown in FIG. 2 is switched from the terminal 4A side to the terminal 4B side and just before entering the standby mode, a CAV command is supplied from the system controller 7 to a reference value register 242 through a terminal 248.

When the CAV command which is supplied from the system controller 7 is inputted, the reference value register 242 latches an output of the FG period measuring circuit 241. Thus, the period of the FG signal when the spindle motor 2 is controlled so as to rotate at a constant linear velocity just before entering the standby mode is latched into the reference value register 242. An output of the reference value register 242 is supplied to a comparing circuit 243.

The present period of the FG signal which is supplied from the detector 2a of the spindle motor 2 is measured by the FG period measuring circuit 241. An output of the FG period measuring circuit 241 is supplied to the comparing circuit 243. The comparing circuit 243 compares a value of the reference value register 242 with the present period of the FG signal which is supplied from the detector 2a of the spindle motor 2, thereby obtaining a speed error and a phase error. An output of the comparing circuit 243 is supplied to a multiplying circuit 245 through a low pass filter 244.

A gain which is set by a gain setting circuit 247 is supplied from the gain setting circuit 247 to the multiplying circuit 245. The gain according to the rotational speed of the optical disc 1 from the gain setting circuit 247 is multiplied to an output of the low pass filter 244. An output of the multiplying circuit 235 is transmitted from an output terminal 249 through a PWM control circuit 246. By this output, the spindle motor 2 is controlled so as to rotate at a constant angular velocity on the basis of a PWM control signal from the PWM control circuit 246.

In case of the fourth embodiment as well, as shown in FIG. 6, it will be obviously understood that when the standby mode is finished and the control mode is again set to the mode to control the spindle motor 2 so as to rotate at a constant linear velocity, the gain at a time point when the optical disc 1, namely, spindle motor 2 is controlled by the CLV servo circuit 5 so as to rotate at a constant linear velocity in accordance with the rotational speed when the optical disc 1 is controlled by the CAV servo circuit 216 so as to rotate at a constant angular velocity so far.

It will be obviously understood that the CAV servo circuits according to the third and fourth embodiments shown in FIGS. 5 to 7 can be applied to the disc recording and/or reproducing apparatus according to the foregoing second embodiment.

The invention is not limited to each of the foregoing embodiments but various modifications are possible within the scope of the invention without largely departing from the essence of the invention. The embodiments have been described above with respect to the example of the apparatus for recording and/or reproducing the recordable optical disc in which the compressed data can be recorded or the read only optical disc in which the compressed data has been recorded. However, the invention can be also applied to a recording and/or reproducing apparatus for recording or reproducing a read only optical disc such as what is called a compact disc in which non-compressed data has been recorded or a recordable optical disc by using a buffer memory.

The present invention is not limited to the foregoing embodiments but many modifications and variations are possible within the spirit and scope of the appended claims of the invention.

What is claimed is:

1. A disc reproducing apparatus comprising:

a head for reading out data recorded on a disc;

a memory for temporarily storing the data read out by said head;

a motor for rotating the disc;

a first rotation control circuit for controlling said motor so as to rotate the disc at a constant linear velocity;

a second rotation control circuit for controlling said motor so as to rotate the disc at a constant angular velocity, in which said second rotation control circuit fetches rotational speed information of the disc when the rotation control circuit is switched from said first rotation control circuit to said second rotation control circuit and controls said motor on the basis of said fetched rotational speed information of the disc when the rotation control circuit is switched from said first rotation control circuit to said second rotation control circuit; and a controller for controlling operations of said head, said memory, and said first and second rotation control circuits, in which said controller controls writing and reading operations of said memory so that the data is read out from said memory at a reading speed slower than a writing speed of the data read out from the disc by said head, said controller stops the reading operation of the data from the disc by said head at a time point when a predetermined amount of data has been written into said memory, controls said head when an amount of the data stored in said memory is equal to or less than the predetermined amount, thereby allowing the reading operation of the data from the disc to be restarted, and said controller forms a switching signal to switch the rotation control circuit from said first rotation control circuit to said second rotation control circuit by said controller, allows said first rotation control circuit to rotate the disc at a constant linear velocity while the data is read out from the disc by said head, and allows said second rotation control circuit to rotate the disc at a constant angular velocity while the reading operation of the data from the disc is stopped by said head.

2. An apparatus according to claim 1, wherein said second rotation control circuit comprises:

a register for fetching the rotational speed information of said disc on the basis of said switching signal from said controller; and a signal forming unit for forming a control signal to rotate said motor at a constant angular velocity on the basis of the rotational speed information of said disc fetched in said register.

3. An apparatus according to claim 2, further comprising a detecting unit for detecting the rotation of said motor, and wherein said signal forming unit has a speed detecting circuit for detecting the rotational speed of said motor on the basis of an output signal from said detecting unit, and an output of said speed detecting circuit is fetched into said register as rotational speed information of said disc.

4. An apparatus according to claim 3, wherein said signal forming unit has a comparing unit for comparing the output of said speed detecting circuit with an output from said register.

5. A disc recording and/or reproducing apparatus comprising:

a head mechanism which is fed in a radial direction of a disc and records data to said disc or reads out data from said disc;

a memory in which the data read out from the disc by said head mechanism is temporarily stored and the data which is recorded to the disc by said head mechanism is temporarily stored;

a motor for rotating the disc;

a first rotation control circuit for controlling said motor so as to rotate the disc at a constant linear velocity;

a second rotation control circuit for controlling said motor so as to rotate the disc at a constant angular velocity, in which said second rotation control circuit fetches rotational speed information of the disc when the rotation control circuit is switched from said first rotation control circuit to said second rotation control circuit and controls said motor on the basis of said fetched rotational speed information of the disc when the rotation control circuit is switched from said first rotation control circuit to said second rotation control circuit; and a controller for controlling operations of said head mechanism, said memory, and said first and second rotation control circuits, in which upon reproduction of the disc, said controller controls writing and reading operations of said memory so that the data is read out from said memory at a reading speed slower than a writing speed of the data read out from the disc by said head mechanism, said controller stops the reading operation of the data from the disc by said head mechanism at a time point when a predetermined amount of data has been written into said memory, controls said head mechanism when an amount of the data stored in said memory is equal to or less than the predetermined amount, thereby allowing the reading operation of the data from the disc to be restarted, and upon recording of the disc, said controller controls the writing and reading operations of said memory at a reading speed higher than the writing speed of the data into said memory, said controller controls said head mechanism at a time point when a predetermined amount of data has been written into said memory, records the data to the disc, and stops the recording of the data to the disc by said head mechanism when an amount of data stored in said memory is equal to or less than the predetermined amount, and said controller forms a switching signal to switch the rotation control circuit from said first rotation control circuit to said second rotation control circuit by said controller, allows said first rotation control circuit to rotate the disc at a constant linear velocity while the data is read out from the disc by said head mechanism or while the data is recorded to the disc by said head mechanism, and allows said second rotation control circuit to rotate the disc at a constant angular velocity while the reading operation of the data from the disc is stopped by said head mechanism or while the recording of the data to the disc is stopped by said head mechanism.

6. An apparatus according to claim 5, wherein said second rotation control circuit comprises:
    a register for fetching the rotational speed information of said disc on the basis of said switching signal from said controller; and
    a signal forming unit for forming a control signal to rotate said motor at a constant angular velocity on the basis of the rotational speed information of said disc fetched in said register.

7. An apparatus according to claim 6, further comprising a detecting unit for detecting the rotation of said motor,
    and wherein said signal forming unit has a speed detecting circuit for detecting the rotational speed of said motor on the basis of an output signal from said detecting unit, and an output of said speed detecting circuit is fetched into said register as rotational speed information of said disc.

8. An apparatus according to claim 7, wherein said signal forming unit has a comparing unit for comparing the output of said speed detecting circuit with an output from said register.

9. A motor rotation control circuit of a disc recording and/or reproducing apparatus, comprising:
    a first rotation control unit to which information extracted from data read out from a disc is supplied and which forms a first control signal to rotate a motor to rotate said disc at a constant linear velocity;
    a second rotation control unit to which a signal indicative of a detection of a rotation of said motor to rotate the disc is supplied and which forms a second control signal to rotate said motor at a constant angular velocity, in which said second rotation control unit fetches rotational speed information of the disc at a timing when the rotation control unit is switched from said first rotation control unit to said second rotation control unit and forms said second control signal to control the motor on the basis of said fetched rotation speed information of the disc at a timing when the rotation control unit is switched from said first rotation control unit to said second rotation control unit; and
    a switching circuit for switching said first and second control signals on the basis of a switching signal which is supplied from a controller and outputting the switched control signal, in which said switching circuit outputs the first control signal from said first rotation control unit while the data is read out from the disc and outputs the second control signal from said second rotation control unit while the reading operation of the data from the disc is stopped.

10. A circuit according to claim 9, wherein said second rotation control unit comprises:
    a register for fetching the rotational speed information of said disc on the basis of said switching signal from said controller; and
    a signal forming unit for forming said second control signal to rotate said motor at a constant angular velocity on the basis of the rotational speed information of said disc fetched in said register.

11. A motor rotation control circuit according to claim 10, wherein said signal forming unit has a speed detecting unit to which an output signal indicative of a detection of the rotation of the motor is supplied and which detects a rotational speed of the motor on the basis of said supplied output signal indicative of the detection of the rotation of the motor, and an output of said speed detecting unit is fetched into said register as rotational speed information of said disc.

12. A motor rotation control circuit according to claim 11, said signal forming unit has a comparing unit for comparing the output of said speed detecting unit with an output from said register.

13. A disc reproducing apparatus comprising:
    a head for reading out data recorded on a disc;
    a memory for temporarily storing the data read out by said head;
    a motor for rotating the disc;
    a first rotation control circuit for controlling said motor so as to rotate the disc at a constant linear velocity;
    a second rotation control circuit for controlling said motor so as to rotate the disc at a constant angular velocity, in which said second rotation control circuit has a gain setting unit to set a gain on the basis of rotational speed information of the disc and forms a control signal to drive said motor on the basis of the gain set by said gain setting unit; and
    a controller for controlling operations of said head, said memory, and said first and second rotation control circuits, in which said controller controls writing and reading operations of said memory so that the data is read out from said memory at a reading speed slower than a writing speed of the data read out from the disc by said head, said controller stops the reading operation of the data from the disc by said head at a time point when a predetermined amount of data has been written into said memory, controls said head when an amount of the data stored in said memory is equal to or less than a predetermined amount, thereby allowing the reading operation of the data from the disc to be restarted, and said controller forms a switching signal to switch the rotation control circuit from said first rotation control circuit to said second rotation control circuit by said controller, allows said first rotation control circuit to rotate the disc at a constant linear velocity while the data is read out from the disc by said head, and allows said second rotation control circuit to rotate the disc at a constant angular velocity while the reading operation of the data from the disc is stopped by said head.

14. An apparatus according to claim 13, wherein said controller forms a reference value such as to minimize a speed difference of said motor between a rotational speed of said motor by said first rotation control circuit and a rotational speed by said second rotation control circuit when the rotation control circuit is switched from said first rotation control circuit to said second rotation control circuit, said second rotation control circuit has a register to fetch said reference value, and said gain setting unit sets the gain on the basis of the reference value fetched in said register.

15. An apparatus according to claim 14, further having a detecting unit for detecting the rotation of said motor, and wherein said second rotation control circuit has a speed detecting circuit for detecting the rotational speed information of said disc on the basis of an output signal from said detecting unit.

16. An apparatus according to claim 15, wherein said second rotation control circuit further comprises:

a comparing unit for comparing said reference value fetched in said register with an output signal from said speed detecting unit; and a multiplying unit for multiplying an output from said comparing unit by the gain set by said gain setting unit, and wherein said control signal is formed on the basis of an output signal from said multiplying unit.

17. An apparatus according to claim 13, wherein said second rotation control circuit has a register to fetch the rotational speed information of said disc on the basis of the switching signal from said controller, and said gain setting unit sets the gain on the basis of said reference value fetched in said register.

18. An apparatus according to claim 17, further having a detecting unit for detecting the rotation of said motor, and wherein said second rotation control circuit has a speed detecting circuit to detect the rotational speed information of said disc on the basis of an output signal from said detecting unit, and an output of said speed detecting circuit is fetched into said register as rotational speed information of said disc.

19. An apparatus according to claim 18, wherein said second rotation control circuit further comprises:

a comparing unit for comparing the output of said speed detecting circuit with an output from said register; and a multiplying unit for multiplying an output from said comparing unit by the gain set by said gain setting unit, and wherein said control signal is formed on the basis of an output signal from said multiplying unit.

20. A disc recording and/or reproducing apparatus comprising:

a head mechanism which is fed in a radial direction of a disc and records data onto said disc or reads out data from the disc;

a memory in which the data read out from said disc by said head mechanism is temporarily stored and the data to be recorded to the disc by said head mechanism is temporarily stored;

a motor to rotate the disc;

a first rotation control circuit for controlling said motor so as to rotate the disc at a constant linear velocity;

a second rotation control circuit for controlling said motor so as to rotate the disc at a constant angular velocity, in which said second rotation control circuit has a gain setting unit to set a gain on the basis of rotational speed information of the disc and forms a control signal to drive said motor on the basis of the gain set by said gain setting unit; and a controller for controlling operations of said head mechanism, said memory, and said first and second rotation control circuits, in which upon reproduction of the disc, said controller controls writing and reading operations of said memory so that the data is read out from said memory at a reading speed slower than a writing speed of the data read out from the disc by said head mechanism, said controller stops the reading operation of the data from the disc by said head mechanism at a time point when a predetermined amount of data has been written into said memory, controls said head mechanism when an amount of the data stored in said memory is equal to or less than the predetermined amount, thereby allowing the reading operation of the data from the disc to be restarted, and upon recording to the disc, said controller controls the writing and reading operations of said memory at a reading speed higher than the writing speed of the data into said memory, said controller controls said head mechanism at a time point when a predetermined amount of data has been written into said memory, records the data to the disc, and stops the recording of the data to the disc by said head mechanism when an amount of data stored in said memory is equal to or less than a predetermined amount, and said controller forms a switching signal to switch the rotation control circuit from said first rotation control circuit to said second rotation control circuit by said controller, allows said first rotation control circuit to rotate the disc at a constant linear velocity while the data is read out from the disc by said head mechanism or while the data is recorded to the disc by said head mechanism, and allows said second rotation control circuit to rotate the disc at a constant angular velocity while the reading operation of the data from the disc is stopped by said head mechanism or while the recording of the data to the disc is stopped by said head mechanism.

21. An apparatus according to claim 20, wherein said controller forms a reference value such as to minimize a speed difference of said motor between a rotational speed of said motor by said first rotation control circuit and a rotational speed by said second rotation control circuit when the rotation control circuit is switched from said first rotation control circuit to said second rotation control circuit, said second rotation control circuit has a register to fetch said reference value, and said gain setting unit sets the gain on the basis of the reference value fetched in said register.

22. An apparatus according to claim 21, further having a detecting unit for detecting the rotation of said motor, and wherein said second rotation control circuit has a speed detecting circuit for detecting a rotational speed of said disc motor on the basis of an output signal from said detecting unit.

23. An apparatus according to claim 22, wherein said second rotation control circuit further comprises:

a comparing unit for comparing said reference value fetched in said register with an output signal from said speed detecting circuit; and a multiplying unit for multiplying an output from said comparing unit by the gain set by said gain setting unit, and wherein said control signal is formed on the basis of an output signal from said multiplying unit.

24. An apparatus according to claim 20, wherein said second rotation control circuit has a register to fetch rotational speed information of said disc on the basis of the switching signal from said controller, and said gain setting unit sets the gain on the basis of said reference value fetched in said register.

25. An apparatus according to claim 24, further having a detecting unit for detecting the rotation of said motor, and wherein said second rotation control circuit has a speed detecting circuit to detect a rotational speed of said disc motor on the basis of an output signal from said detecting unit, and an output of said speed detecting circuit is fetched into said register as rotational speed information of said disc.

26. An apparatus according to claim 25, wherein said second rotation control circuit further comprises:

a comparing unit for comparing the output of said speed detecting circuit with an output from said register; and a multiplying unit for multiplying an output from said comparing unit by the gain set by said gain setting unit, and wherein said control signal is formed on the basis of an output signal from said multiplying unit.

27. A motor rotation control circuit of a disc recording and/or reproducing apparatus, comprising:

a first rotation control unit to which information extracted from data read out from a disc is supplied and which forms a first control signal to rotate a motor to rotate said disc at a constant linear velocity;

a second rotation control unit to which a signal indicative of a detection of a rotation of said motor to rotate the disc is supplied and which forms a second control signal to rotate said motor at a constant angular velocity, in which said second rotation control unit has a gain setting unit to set a gain on the basis of said supplied signal indicative of the detection of the rotation of the motor and forms a second control signal to drive said motor on the basis of the gain set by said gain setting unit; and a switching circuit for switching said first and second control signals on the basis of a switching signal which is supplied from a controller and outputting the switched control signal, in which said switching circuit outputs the first control signal from said first rotation control unit while the data is read out from the disc and outputs the second control signal from said second rotation control unit while the reading operation of the data from the disc is stopped.

28. A circuit according to claim 27, wherein said second rotation control unit has a register for fetching a reference value which is supplied from said controller such as to minimize a speed difference between a rotational speed of the motor by said first rotation control unit and a rotational speed by said second rotation control unit when the rotation control unit is switched from said first rotation control unit to said second rotation control unit, and said gain setting unit sets the gain on the basis of said reference value fetched in said register.

29. A circuit according to claim 28, wherein an output signal indicative of the detection of the rotation of the motor is supplied to said second rotation control unit, said second rotation control unit has a speed detecting unit to detect rotational speed information of the motor on the basis of said supplied output signal indicative of the detection of the rotation of the motor, and an output of said speed detecting unit is fetched into said register.

30. A circuit according to claim 29, wherein said second rotation control unit further comprises:

a comparing unit for comparing said reference value fetched in said register with an output signal from said speed detecting unit; and a multiplying unit for multiplying an output from said comparing unit by the gain set by said gain setting unit, and wherein said second control signal is formed on the basis of an output signal from said multiplying unit.

31. A circuit according to claim 27, wherein an output signal indicative of the detection of the rotation of the motor is supplied to said second rotation control unit, and said second rotation control unit comprises:

a speed detecting unit for detecting rotational speed information of the motor on the basis of said supplied output signal indicative of the detection of the rotation of the motor; and a register for fetching an output from said speed detecting unit on the basis of the switching signal from said controller.

32. A circuit according to claim 31, wherein said second rotation control unit comprises:

a comparing unit for comparing an output of said speed detecting unit with an output from said register; and a multiplying unit for multiplying an output from said comparing unit by the gain set by said gain setting unit, and said second control signal is formed on the basis of an output signal from said multiplying unit.

* * * * *